(12) United States Patent
Ye

(10) Patent No.: US 11,069,306 B2
(45) Date of Patent: Jul. 20, 2021

(54) ELECTRONIC DEVICE AND CONTROL METHOD THEREOF

(71) Applicant: Lenovo (Beijing) Co., Ltd., Beijing (CN)

(72) Inventor: Song Ye, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/727,901

(22) Filed: Dec. 26, 2019

(65) Prior Publication Data

US 2020/0211483 A1    Jul. 2, 2020

(30) Foreign Application Priority Data

Dec. 29, 2018   (CN) .......................... 201811645791.8

(51) Int. Cl.
*G09G 3/34*   (2006.01)
*G09F 9/33*   (2006.01)
(Continued)

(52) U.S. Cl.
CPC ............ *G09G 3/3413* (2013.01); *G09F 9/33* (2013.01); *G02F 1/133603* (2013.01); *G06F 3/1446* (2013.01)

(58) Field of Classification Search
CPC .............. G02B 27/017; G02B 27/0172; G02B 2027/014; G02B 2027/0187; G02B 2027/0178; G06F 3/011; G06F 3/012; G06F 3/1446; G06F 3/147; G09G 3/3413; G09G 2330/045; G09G 3/003; G09G 3/002; G09G 2360/144; G09G 2340/14; G09F 9/33; G02F 1/133603
See application file for complete search history.

(56) References Cited

U.S. PATENT DOCUMENTS 4,582,394 A * 4/1986 Boyd ....................... G02B 5/32
                                                              345/22
4,760,389 A * 7/1988 Aoki ................. G02F 1/133604
                                                             345/102
(Continued)

FOREIGN PATENT DOCUMENTS

CN         102681164 A    9/2012
CN         104091545 A   10/2014
(Continued)

*Primary Examiner* — Koosha Sharifi-Tafreshi
(74) *Attorney, Agent, or Firm* — Anova Law Group, PLLC

(57) ABSTRACT

An electronic device is provided. The electronic device includes a display device, a detector, a processing unit, and an adjustment device. The display device is configured to output emitted light of corresponding displayed content according to a display signal. The emitted light is configured to allow the displayed content to be perceivable to a viewer, and ambient light outside the electronic device is able to be incident on the display device along a direction opposite to the emitted light. The detector is configured to acquire detection data. The processing unit is configured to determine whether a first condition is met according to the detection data and generate a control instruction in response to the first condition being met; and the adjustment device is configured to reduce an influence of the ambient light on the display device under the control instruction.

18 Claims, 5 Drawing Sheets

(51) Int. Cl.
*G02F 1/13357* (2006.01)
*G06F 3/14* (2006.01)

(56) References Cited

U.S. PATENT DOCUMENTS

| | | | |
|---|---|---|---|
| 6,177,966 B1* | 1/2001 | Masuda | G02B 27/0172 349/8 |
| 2003/0063109 A1* | 4/2003 | Motai | G09G 3/3659 345/690 |
| 2004/0104864 A1* | 6/2004 | Nakada | G02B 27/017 345/8 |
| 2006/0256065 A1* | 11/2006 | Jung | G09G 3/3685 345/100 |
| 2007/0146295 A1* | 6/2007 | Yu | G09G 3/3406 345/102 |
| 2013/0108229 A1* | 5/2013 | Starner | G02B 27/01 385/119 |
| 2015/0187115 A1* | 7/2015 | MacDonald | G06F 3/013 345/419 |
| 2017/0059960 A1 | 3/2017 | Shi et al. | |
| 2020/0033615 A1* | 1/2020 | Kim | G09G 3/003 |

FOREIGN PATENT DOCUMENTS

| | | |
|---|---|---|
| CN | 104880824 A | 9/2015 |
| CN | 105469749 A | 4/2016 |
| CN | 105929957 A | 9/2016 |
| CN | 107533362 A | 1/2018 |
| CN | 207676050 U | 7/2018 |
| CN | 108663799 A | 10/2018 |
| CN | 108873418 A | 11/2018 |
| CN | 108874030 A | 11/2018 |
| CN | 108919531 A | 11/2018 |
| CN | 208283654 U | 12/2018 |

\* cited by examiner

ELECTRONIC DEVICE AND CONTROL METHOD THEREOF

CROSS-REFERENCES TO RELATED APPLICATION

This application claims the priority of Chinese Patent Application No. 201811645791.8, filed on Dec. 29, 2018, the content of which is incorporated herein by reference in its entirety.

TECHNICAL FIELD

The present disclosure generally relates to the field of information processing technologies and, more particularly, relates to an electronic device and a control method thereof.

BACKGROUND

Most of existing electronic devices include display devices for outputting display content. When a display device is in operation, emitted light is emitted outward, and the emitted light is diffused to external space, to make users perceive the display content. When the display device is not working, ambient light is transmitted to the display device along a path opposite to the emitted light. The light intensity in a local area of the display device is too large due to the light, the performance of the display device is affected.

SUMMARY

One aspect of the present disclosure provides an electronic device. The electronic device includes a display device, a detector, a processing unit, and an adjustment device. The display device is configured to output emitted light of corresponding displayed content according to a display signal. The emitted light is configured to allow the displayed content to be perceivable to a viewer, and ambient light outside the electronic device is able to be incident on the display device along a direction opposite to the emitted light. The detector is configured to acquire detection data. The processing unit is configured to determine whether a first condition is met according to the detection data and generate a control instruction in response to the first condition being met; and the adjustment device is configured to reduce an influence of the ambient light on the display device under the control instruction.

Another aspect of the present disclosure provides a control method for an electronic device. The method includes: acquiring detection data; determining whether a first condition is satisfied according to the detection data and generating a control instruction in response to the first condition being met; and reducing an influence of the ambient light on the display device under control of the control instruction. The electronic device includes a display device configured to output emitted light of corresponding display content according to display signal, a detector for acquiring detection data, a processing unit configured to determine whether a first condition is satisfied according to the detection data and generating a control instruction in response to the first condition being met, and an adjustment device for reducing an influence of the ambient light on the display device under control of the control instruction. The emitted light is configured to allow the displayed content to be perceivable to a viewer and ambient light outside the electronic device is able to be incident on the display device along a direction opposite to the emitted light.

Another aspect of the present disclosure provides a non-transitory computer readable storage medium, configured to store program instructions. The program instructions is configured to be executed to perform a method including acquiring detection data; determining whether a first condition is satisfied according to the detection data and generating a control instruction in response to the first condition being met; and reducing an influence of the ambient light on the display device under control of the control instruction. The method is applied to an electronic device includes a display device configured to output emitted light of corresponding display content according to display signal, a detector for acquiring detection data, a processing unit configured to determine whether a first condition is satisfied according to the detection data and generating a control instruction in response to the first condition being met, and an adjustment device for reducing an influence of the ambient light on the display device under control of the control instruction. The emitted light is configured to allow the displayed content to be perceivable to a viewer and ambient light outside the electronic device is able to be incident on the display device along a direction opposite to the emitted light.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Various embodiments of the present disclosure provide an electronic device. The electronic device may be a portable terminal (such as a cell phone and a tablet) or another electronic device supporting wireless communication networks.

Figure 1:
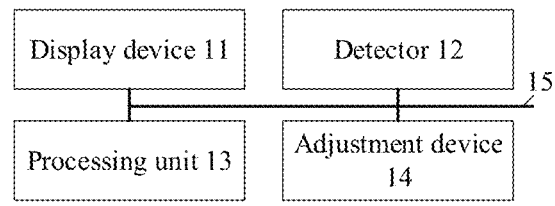
FIG. 1 illustrates an example electronic device consistent with various disclosed embodiments of the present disclosure.

The present disclosure provides an electronic device. As illustrated in FIG. 1, the electronic device may include a display device 11, a detector 12, a processing unit 13, and an adjustment device 14.

The display device 11 may output emitted light of corresponding displayed content according to display signal. The emitted light may be light that is configured to allow an audience to perceive the displayed content. Ambient light outside the electronic device may incident on the display device along a direction opposite to a direction of the emitted light.

The detector 12 may be used to obtain detection data.

The processing unit 13 may at least determine whether a first condition is met according to the detection data and generate a control instruction when the first condition is met.

The adjustment device 14 may be configured to reduce an influence of the display device from the ambient light controlled according to the control instruction.

The display device 11, the detector 12, the processing unit 13, and the adjustment device 14 may be connected by a bus system 15. The bus system 15 may be used to achieve connecting communication between these devices. The bus system 15 may include a data bus, a power bus, a control bus, and a status signal bus. All of these buses are labeled as the bus system 15 in the figures.

The electronic device provided by various embodiments of the present disclosure can be applied to various scenarios.

In Scenario 1, the display device may include a display module for output initial light corresponding to the displayed content, and an optical module in an irradiation range of the initial light for forming the emitted light. Along the direction opposite to the emitted light, the ambient light outside the electronic device may incident on the display module through the optical module. A diameter of the emitted light may be larger than a diameter of the initial light. When the display module is small, the optical module (such as the lens group) may change a propagation path of initial light of the display module, to form an enlarged virtual image of the display content on the display module that can be perceivable to the user. The optical module may have a divergent effect on the initial light and a converging effect on the reversely incident light.

Figure 2A:
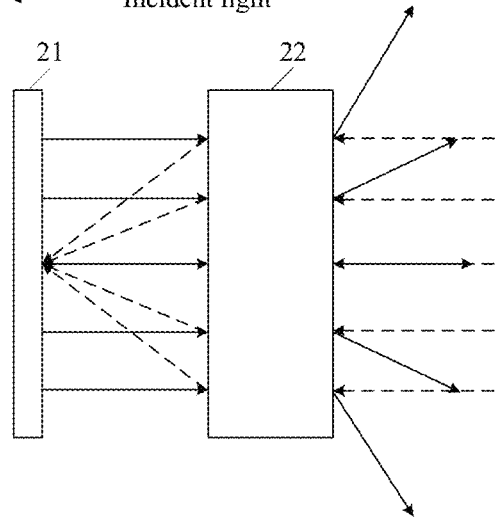
FIG. 2A illustrates an example display device consistent with various disclosed embodiments of the present disclosure.

FIG. 2A illustrates a display device provided by an embodiment of the present disclosure. As illustrated in FIG. 2A, the display device may include a display module 21 and an optical module 22. Solid arrows indicate a direction of the emitted light of the display device, and dashed arrows indicate a direction of the incident light of the display device. When the display device operates, the solid arrows between the display module 21 and the optical module 22 denote the initial light. Light path of the initial light may be changed after the initial light passes through the optical module 22, and divergent emitted light may be achieved. The emitted light may be emitted to the external space of the electronic device and may be perceivable to users. When the display device is not in operation, ambient light may be converged on the display module 21 through the optical module 22 along a direction opposite to the direction of the emitted light (a direction indicated by the dashed arrows in FIG. 2A). For description purposes only, the embodiment in FIG. 2A where only one light path of the emitted light and the incident light is shown is used as an example to illustrate the present disclosure, and should not limit the scopes of the present disclosure. In various embodiments, the display device may have any suitable light path.

Because of the converging effect of the optical module on the ambient light, when the ambient light reaches the display module via the optical component, it may be converged to a part of the display module, which may increase the light intensity of a part of the area. Therefore, it is necessary to reduce the light intensity of these areas to prevent the temperature of these areas from being too high due to excessive light intensity for a long time, which may damage the display component and thereby cause yellowing to affect the display effect of reuse.

The adjustment device may change optical parameters of the display device controlled by the control instruction, to reduce a difference between the light intensity of unit areas of the display module.

In some embodiments, reducing the difference between the light intensity of the unit areas of the display module may be substantially reducing the maximum light intensity on the unit areas. The unit areas may be sub-areas into which the display module is divided. For example, the size of each sub-area may be 10*10 pixels, 20*20 pixels, or 50*50 pixels. The granularity of the unit areas may be determined according to actual needs. Specifically, the display module is able to be divided into multiple sub-areas, and the average light intensity in each sub-area may be used as the light intensity of the sub-area or the light intensity at the center of each sub-area may be used as the light intensity of the sub-area. When the convergence of the incident light is too strong, there will be a large difference between the light intensity of one sub-area and the light intensity of other sub-areas. When the convergence degree is reduced by changing the focal length, the light intensity difference between the sub-area that have a large light intensity originally and the other sub-areas may decrease. Correspondingly, the light intensity difference can also be used as a basis for measuring the adjustment effect.

The difference in light intensity of unit areas may be the difference between the maximum light intensity and the minimum light intensity of the display module, or the difference between the maximum light intensity and the average light intensity of the entire display module. For example, the display module may be divided into four sub-areas. Before the adjustment device changes the optical parameters of the display device, the light intensity of the four sub-areas may be 3, 5, 7, 3, and the average light intensity may be 4.5. A difference between the maximum light intensity and the minimum light may be 4, and the difference between the maximum light intensity and the average light intensity may be 2.5. After changing the optical parameters of the display device, the light intensities of the four sub-areas a=may be 3, 3, 4, and 3, respectively, and the average light intensity may be 3.25. The difference between the maximum light intensity and minimum light intensity may be 1, and the difference between the maximum light intensity and average light intensity may be 0.75. It is obvious that the adjustment device reduces the difference in light intensity of the unit areas of the display module by changing the optical parameters of the display device.

The optical parameter may be a focal length of the optical module. In some embodiments, the optical module has a first mode and a second mode. The first mode has a first focal length, and the second mode has a second focal length. The adjusting device may be configured to convert the optical module from the first mode to the second mode. A distance between the focal point and the display module when the optical module is at the second focal length may be larger than a distance between the focal point and the display module when the optical module is at the first focal length. That is, by changing the focal length of the optical module, the focus of the optical module may fall in a space other than the display module, such as the space in front of or behind the display module. With the total light intensity unchanged, the change in focal length may spread the total light intensity over a larger area to reduce the maximum light intensity received in a unit area.

Figure 2B:
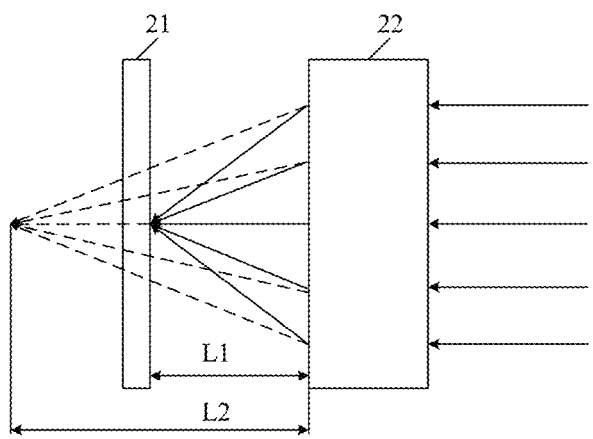
FIG. 2B illustrates another example display device consistent with various disclosed embodiments of the present disclosure.

FIG. 2B illustrates a display device provided by the embodiment of the present disclosure. As illustrated in FIG. 2B, when the focal length of the optical module 22 is L1, the focus may fall on the display module 21. It can be understood that all incident light may be concentrated near the focal point. When the focal length of the optical module 22 is L2 (L2 is larger than L1), the focus falls behind the display module. The incident light converging near the focus may be spread into a larger area, to reduce the maximum light intensity received in a unit area.

Figure 2C:
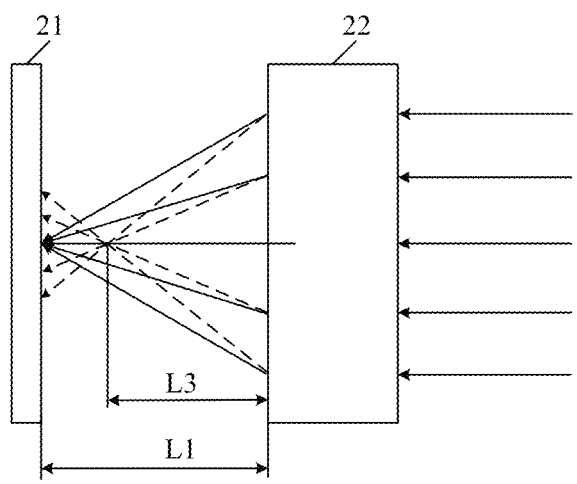
FIG. 2C illustrates another example display device consistent with various disclosed embodiments of the present disclosure.

FIG. 2C illustrates a display device provided by the embodiment of the present disclosure. As illustrated in FIG. 2C, when the focal length of the optical module 22 is L1, the focus may fall on the display module 21. It can be understood that all incident light may be concentrated near the focal point. When the focal length of the optical module 22 is L3 (L3 is smaller than L1), the focus falls in front of the display module. The incident light converging near the focus originally may be spread into a larger area, to reduce the maximum light intensity received in a unit area.

Figure 2D:
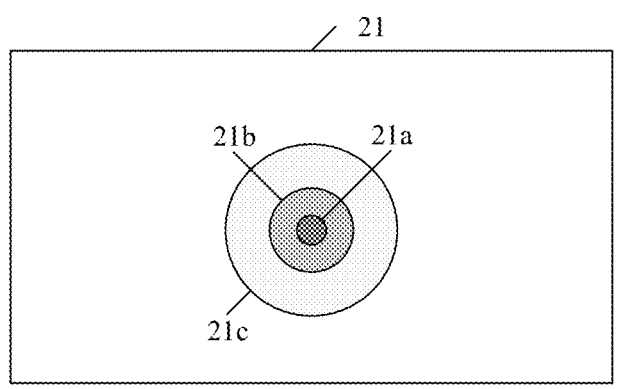
FIG. 2D illustrates the convergence of the light in an example display device consistent with various disclosed embodiments of the present disclosure.

FIG. 2D illustrates the light of the display module provided by the embodiment of the present disclosure. As illustrated in FIG. 2D, when the focal length of the optical module is L1, a corresponding illuminated area on the display module 21 is 21a; when the focal length of the optical module is L2, a corresponding illuminated area on the display module 21 is 21b; when the focal length of the optical module is L3, a corresponding illuminated area on the display module 21 is 21c. An illuminated area with a darker color may have a large light intensity. When the incident light is the same, an illuminated area with a larger area may have a smaller maximum light intensity received per unit area. Correspondingly, the average light intensity in the illuminated area 21c is smaller than the illuminated area 21b, and the average light intensity in the illuminated area 21b is smaller than the illuminated area 21a.

In some embodiments, the method for adjusting the focal length of the display device may further include, when the optical module is a single optical device, adjusting the focal length of the display device by changing the optical characteristics of the optical device. For example, the thickness of the convex lens is able to be adjusted, and the specific convex lens may have elastic sidewalls and liquid/gas fillings. The elastic sidewall may be deformed to change the focal length of the lens. For example, the side wall of the convex lens may be a transparent material with a certain elastic deformation capacity. An internal space of the convex lens may be filled with liquid or gas. A volume of the convex lens may be increased by filling liquid or gas into the internal space of the convex lens. Correspondingly, at least one of the parameters including refractive index, thickness, and radius of curvature of the convex lens, may be changed to increases the focal length of the convex lens. Some liquid or gas may be excluded from the convex lens to make the volume of the convex lens smaller. Correspondingly, at least one of the parameters including refractive index, thickness, and radius of curvature of the convex lens, may be changed to reduce the focal length of the convex lens. A change in the refractive index of the convex lens may be also related to the refractive indices of the liquid and the gas itself. In some other embodiments, when the optical module contains multiple optical devices such as a lens group, a positional relationship between the lenses may be adjusted to change the focal length.

In another embodiment, the optical module and the display module may have a first positional relationship and a second positional relationship, and the adjustment device may be configured to convert the positional relationship of the optical module and the display module from the first positional relationship to the second positional relationship. The distance between the focus of the optical module and the display module in the second positional relationship may be larger than the distance between the focus of the optical module and the display module in the first positional relationship. That is, the focus of the optical module may be configured to fall in a space outside the display module by changing the positional relationship between the optical module and the display module.

Figure 3:
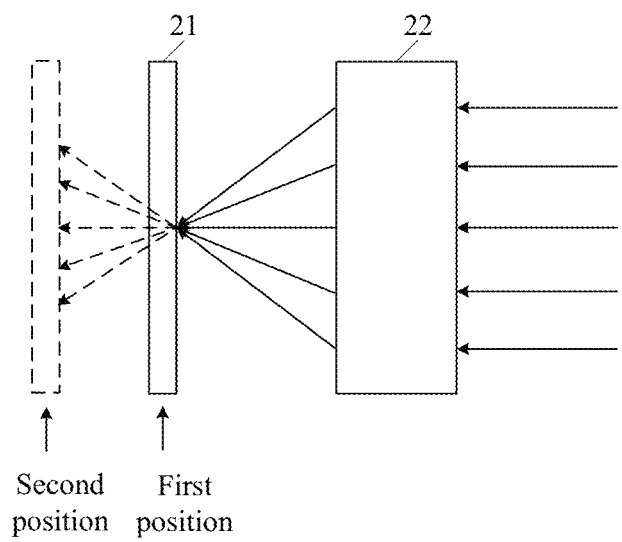
FIG. 3 illustrates another example display device consistent with various disclosed embodiments of the present disclosure.

FIG. 3 illustrates another display device consistent with various embodiments of the present disclosure. As illustrated in FIG. 3, in some embodiments, a first positional relationship may be a positional relationship between the display module 21 and the optical module 22 when the display module 21 is located at the first position, and a second positional relationship may be a positional relationship between the display module 21 and the optical module 22 when the display module 21 is located at the second position. As illustrated in FIG. 3, when the display module 21 is located at the first position, the focus of the optical module may fall on the display module 21, and when the display module 21 is located at the second position, the focus of the optical module may fall in the space in front of the display module 21. When the display module 21 is moved from the first position to the second position, the incident light that originally is concentrated near the focus may be spread into a larger area, to reduce the maximum light intensity in the unit area.

In various embodiments, adjustment of the position relationship between the display module 21 and the optical module 22 may be achieved by changing the position of the display module 21, by changing the position of the optical module 22, or by changing the position of both the display module 21 and the optical module 22.

In some embodiments of the present application, in addition to responding to the control instruction, the adjustment device may also respond to an adjustment input to implement mechanical adjustment. The adjustment input may be a focus adjustment instruction input through a focus adjustment knob. That is, a manual focus adjustment may be achieved by the focus adjustment knob.

In addition to the functions described in the above embodiments of the present application, the adjustment device may also be used to adjust the emitted light formed according to the initial light, so that the emitted light may allow a viewer to perceive the display content. That is, the adjustment device may be an original device for adjusting display effects of the electronic device. The electronic device provided in the embodiment of the present disclosure may multiplex the original adjustment device, and the control method of the present disclosure may be implemented without adding additional hardware units.

In another embodiment, the detector may be configured to obtain first detection data; the processing unit may be configured to generate a first sub-instruction when the first detection data meets a first condition; and the adjustment device may be configured to perform adjustment in a first manner in response to the first sub-instruction; the detector may be configured to obtain second detection data again; the processing unit may be configured to generates a second sub-instruction when a change of the second detection data relative to the first detection data becomes not far from the first condition; the adjustment device may be configured to respond to the second sub-instruction and perform adjustment in a second manner opposite to the first manner.

The first condition may include: a parameter value of the detection data is larger than a parameter threshold, and/or a parameter value change amount is larger than a change amount threshold value. For example, when the detection data is temperature data, the first condition may be that the temperature value is larger than a temperature threshold value; and/or that the temperature value change amount is larger than a change amount threshold value. The temperature threshold may be an upper limit value of the operating temperature range of the display module, such as 40 Celsius degrees, and the first condition may be satisfied when the maximum temperature value of the display module is larger than 40 Celsius degrees. The temperature change threshold may be used to measure a speed of the temperature change, and may be a maximum temperature change allowed in a unit time. For example, the maximum temperature change allowed within 1 hour may be 5 Celsius degrees. The first condition may be satisfied when the temperature change of the display module within 1 hour is larger than 5 Celsius degrees.

The first manner may be converting the optical module from the first mode to the second mode, or converting the position relationship between the optical module and the display module from the first position relationship to the second position relationship. The second manner may be converting the optical module from the second mode to the first mode or converting the position relationship between the optical module and the display module from the second position relationship to the first position relationship. The distance between the focus of the optical module with the second focal length and the display module, and the distance between the focus of the optical module with the first focal length and the display module may change. The distance between the focus of the optical module length and the display module in the second position relationship, and the distance between the focus of the optical and the display module in the first position relationship may not be fixed.

The first sub-instruction may be generated when the first detection data meets the first condition, and the focal length of the optical module or the position relationship between the optical module and the display module may be adjusted in response to the first sub-instruction. After a certain period, the second detection data may be obtained. Whether the previous first manner can reduce an influence of the ambient light on the display device may be determined according to the second detection data, that is, whether the change of the second detection data relative to the first detection data is far from the first condition may be determined. That the change of the second detection data relative to the first detection data is far from the first condition may be that a difference between the parameter value of the first detection data and the parameter threshold value is larger than a difference between the parameter value of the second detection data and the parameter threshold value. When a change trend of the second detection data relative to the first detection data is becoming smaller and smaller than the parameter threshold value from close to the parameter threshold value, the change of the second detection data relative to the first detection data may be far from the first condition. That the change of the second detection data relative to the first detection data is not far from the first condition may be that a difference between the parameter value of the first detection data and the parameter threshold value is smaller than a difference between the parameter value of the second detection data and the parameter threshold value. When a change trend of the second detection data relative to the first detection data is becoming larger and larger than the parameter threshold value, the change of the second detection data relative to the first detection data may be not far from the first condition.

When the change of the second detection data relative to the first detection data is not far from the first condition, the second sub-instruction may be generated, and the adjustment may be performed in the second manner in response to the second sub-instruction. The second manner may be opposite to the first manner. That is, when the first manner increases the focal length, the second manner may reduce the focal length; may the first manner reduces the focal length, the second manner will increase the focal length; may the first manner increases the distance between the display module and the optical module, the second manner may reduce the distance between the display module and the optical module; may the first manner decreases the distance between the display module and the optical module, the second manner may increase the distance between the display module and the optical module.

In the present disclosure, when the adjustment direction cannot be determined, the current adjustment manner may be determined whether it makes the focus closer to the display module or away from the display module by determining whether the change of the second detection data relative to the first detection data is far from the first condition. When the adjustment manner makes the focus closer to the display module (that is, the change of the second detection data relative to the first detection data is not far from the first condition), the present adjustment direction may be opposite to the desired direction, and an automatic adjustment of the adjustment direction or reminding the user to manual adjust may be achieved by generating the second sub-instruction. When the adjustment manner makes the focus away from the display module (that is, the change of the second detection data relative to the first detection data is far from the first condition), the present adjustment direction may be same as the desired direction. When the adjustment direction cannot be determined, whether the present adjustment direction is same as the desired direction may be determined precisely by the present method, and an adjustment error may be avoided.

In some embodiments, finally, the relative position between the optical module and the display module may be adjusted to a specific position that focus is completely impossible. For example, the optical module may be moved out of the optical path that the light incidents on the display device along the direction opposite to the direction of the emitted light, that is, the display module or the optical module may be moved along a direction perpendicular to the optical path direction, for example, left and right or up and down. In another embodiment, the focal length of the optical module may be adjusted out of an allowable range of focal length change when the display device displays normally. The allowable range of focal length change when the display device displays normally may means that: when the focal length changes within the allowable range, the focusing operation under different modes is able to be realized, and when the focal length is outside the range, the focusing cannot be realized. That is, the focus of the optical module may not fall on the display module, and the display device cannot display normally.

The detection data may be a temperature value. For example, when the temperature value is the temperature value of the surface of the display module, the display module may be divided into multiple sub areas. For example, the size of each sub areas is able to be 10*10 pixels, 20*20 pixels or 50*50 pixels, and the granularity of the sub areas is able to be determined according to the actual needs. The temperature at the center of each sub area is taken as the temperature of the sub area. When measuring the temperature of one sub area, the temperature at the center of the sub area may be conducted to a temperature sensor through a metal lead. The temperature sensor may detect the temperature of different sub areas to obtain at least one temperature value, and determines the maximum temperature value of the display module from the at least one temperature value. The position of the metal lead wires may be evenly or unevenly distributed on the surface of the display module. When the metal lead wires are evenly distributed, the metal lead wires may be disposed at the center of each sub area. When the metal lead wires are unevenly distributed, the distribution density of the metal lead wires in the focus area may be larger than the distribution density of the metal lead wires in the non-focus area. Since the light intensity received on the surface of the display screen in the focus area is the largest, the highest temperature value may appear at the focus frequently. Therefore, the detecting efficiency of the temperature value may be improved by disposing the temperature sensor near the focus. When detecting the temperature conducted by the multiple metal lead wires, the multiple metal lead wires may be detected at the same time or sequentially in the way of rotation training. The dispose of the metal lead wires may not block the display module, and the user may not perceive the existence of the metal lead wires when watching.

In some embodiments, the temperature value may be temperature near the display module of the electronic device. For example, when the incident amount of ambient light is larger, the brightness near the display module of the electronic device may be larger. The temperature sensor may be disposed near the display module and outside the light path of the incident light. The temperature threshold value may be determined experimentally. The detected temperature value in the non-operation state smaller than the temperature threshold value may indicate that the intensity of the light incident into the interior of the electronic device is within the allowable range. Otherwise the intensity of the light incident into the interior of the electronic device may exceed the allowable range. When the incident amount of the ambient light is too large, the surface temperature of the display module may be too high.

In another embodiment, the detection data may be the light intensity. For example, the light intensity may be the light intensity on the surface of the display module. An image acquisition unit (such as a camera) may be disposed inside the electronic device. The image acquisition unit can collect images of at least a part of the display area in the display module, and may be disposed outside the incident light path. As the surface of the display module is brighter when the light intensity is stronger, after the image acquisition unit collects the image of the display module, it may perform image processing to obtain the gray values of the images in different sub areas. When the gray value of one sub area is larger, the light intensity of the sub-area may be stronger. The gray value of the image in one sub area is able to be the gray value of the pixel at the center of the sub area, or the average value of the gray value of the pixels in the sub area.

In another embodiment, the detection data may be the light intensity near the display module of the electronic device. A brightness sensor may be disposed near the display module of the electronic device. When the amount of incident light is larger, the brightness of the display module near the electronic device may be larger. The brightness sensor may be disposed close to the display module and disposed outside the incident light path. The brightness threshold may be determined through experiments. When the detected brightness value is smaller than the brightness threshold in the non-operation state, the intensity of the light incident into the electronic device may be within the allowable range. Otherwise the intensity of the light incident into the electronic device may exceed the allowable range. A large amount of incident ambient light may cause excessive light intensity on the surface of the display module.

Correspondingly, in some embodiments, the first condition may be that the temperature value is larger than the temperature threshold value; and/or that the temperature value change amount is larger than the change amount threshold value. The temperature threshold may be the upper limit of the operating temperature range of the display module. The temperature change threshold may be used to measure the temperature change speed, and may be the maximum temperature change allowed in a unit time.

In another embodiment, the first condition may be that the light intensity is larger than the light intensity threshold value; and/or, the light intensity change amount is larger than the change amount threshold value. The light intensity threshold may be the maximum light intensity value that the display module can withstand. When the light intensity received by the display module is larger than the light intensity threshold, it will affect the display effect. The light intensity change threshold may be used to measure the speed of light intensity change, and may be the maximum light intensity change allowed in a unit time.

In Scenario 2, the adjustment device may be used to adjust an incident amount of the ambient light incident on the display device along the direction opposite to the direction of the emitted light under the control of the control instruction. Reducing the influence of the ambient light on the display device may be achieved by reducing the incident amount of the ambient light incident on the display device.

In some embodiments, the adjustment device may include a shielding component; the shielding component may be disposed in the light path of the light incident on the display device along the direction opposite to the emitted light, and may have a first state and a second state. When the shielding component is in a first state, a first ratio of the ambient light is able to be incident on the display device, and when the shielding component is in a second state, a second ratio of the ambient light is able to be incident on the display device. The first ratio may be larger than the second ratio.

For example, the shielding component in the first state may correspond to a first cross section in the light path; in the second state, the shielding component may correspond to a second cross section in the light path. The first cross section may be smaller than the second cross section.

In some embodiments, in a first state, the shielding component may be in a first posture; in a second state, the shielding component may be in a second posture. When the shielding component is a retractable component, the first posture may be a folded posture or a wound posture, and the second posture may be a tiled posture. Specifically, the folding posture is able to be shaped like a shutter where a plurality of light shielding sheets may be stacked together, and the corresponding tile posture may be that the plurality of light shielding sheets may be sequentially connected in the same plane. The winding posture may be similar to the closed state of a scroll, and the corresponding tile posture may be similar to an expanded state of the scroll.

Figure 4:
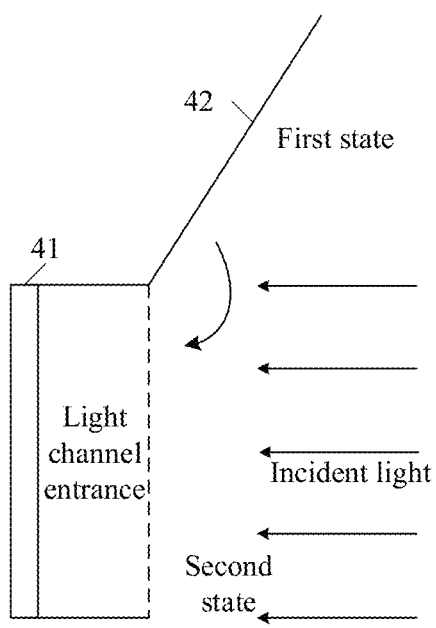
FIG. 4 illustrates another example display device consistent with various disclosed embodiments of the present disclosure.

FIG. 4 illustrates a schematic structural diagram of the display device in the embodiment of the present application. As shown in FIG. 4, the shielding component may be a shielding plate 42. The light path of the light that is incident on the display device 41 along the direction opposite to the emitted light may be the solid lines in FIG. 4 pointing to the left. When the shielding plate 42 is in the first state, there may be no first cross section (it can also be understood that the first cross-sectional area may be 0) and the first ratio may be 100%. The shielding plate 42 may not block the incident light path. The incident light enters the entrance of the light channel and reaches the display device 41. When the shielding plate 42 is in the second state shown by the dotted line, the second cross section may be the cross section of the entrance of the light channel, and the second ratio may be 0%. The shielding plate may completely block the entrance of the light channel, and the incident light cannot reach the display device 41. For description purposes only, the above first ratio and second ratio are used as an example where the light scattering is not taken into account, and it should not limit the actual block ratio. The actual block ratio may be different from the above example.

In some embodiments, the shielding component in the first state may have a first light transmittance, and the shielding component in the second state may have a second light transmittance. The first light transmittance may be larger than the second light transmittance.

In some embodiments, the shielding component may be a lens. The lens may have a high light transmittance when the ambient light is weak, and a low light transmittance when the ambient light is strong. For example, the lens may be a spectacle lens with variable transmittance. The lens may automatically change the transmittance when receiving strong ambient light.

In some embodiments, the display device may specifically include: a display component for outputting an initial light corresponding to the displayed content; and an optical component located in an irradiation range of the initial light for forming the emitted light. The ambient light outside the electronic device may be incident on the display component through the optical component along a direction opposite to the emitted light. The diameter of the initial light may be larger than the diameter of the emitted light. The optical component may have a divergent effect on the initial light and a converging effect on the incident light.

In Scenario 3, the electronic device may further include a wearing device. The wearing device may be configured to maintain a relative positional relationship between the electronic device and a viewer, so that after the electronic device is worn by the viewer, the emitted light may be directed toward the viewer.

The detector may be configured to obtain data indicating whether the electronic device is worn; and the processing unit may be configured to generate a control instruction when the data indicating whether the electronic device is worn satisfies the first condition. The adjustment device may be configured to reduce the influence of the display device from the ambient light under the control of the control instruction. The first condition may be a condition indicating that the electronic device is worn.

That is, the electronic device may be a wearable device, such as a helmet-type device, a glasses-type device, a bracelet device, and the like.

Figure 5:
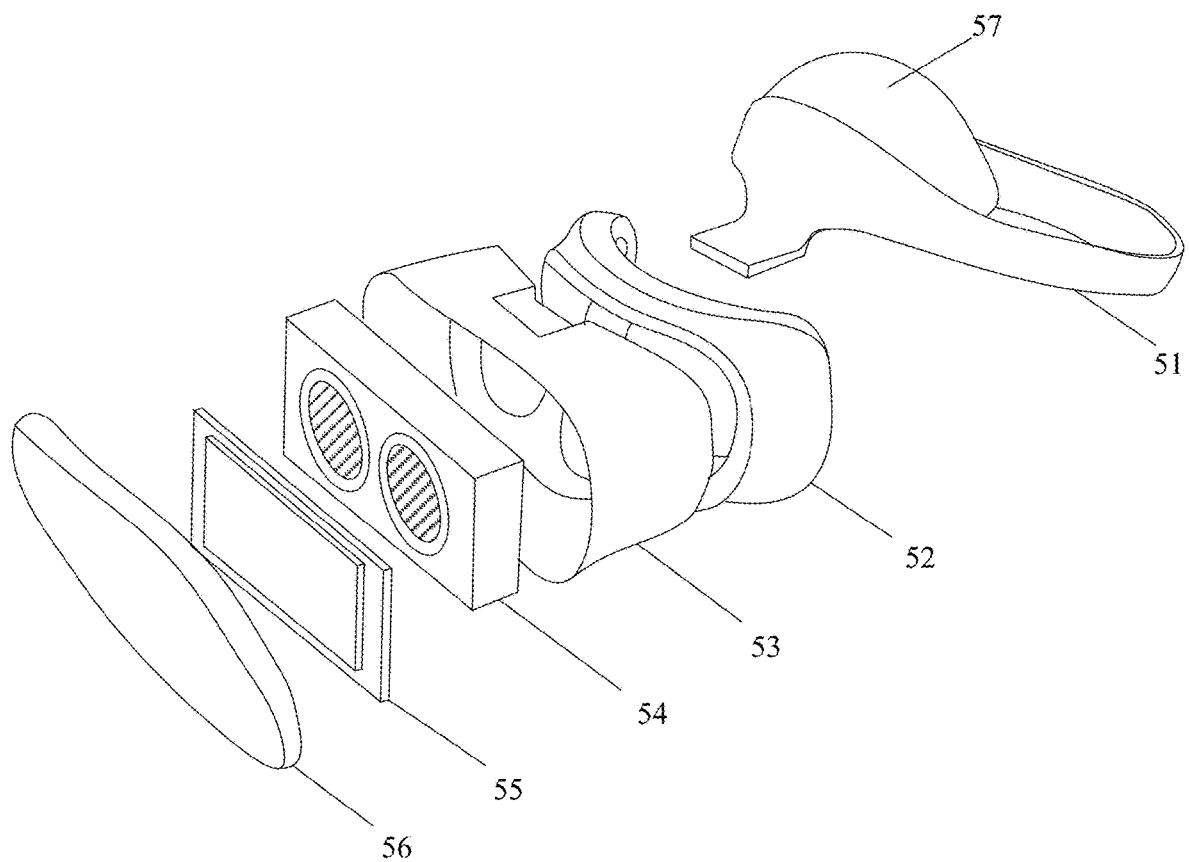
FIG. 5 illustrates another example electronic device consistent with various disclosed embodiments of the present disclosure.

FIG. 5 is a schematic structural diagram of an electronic device in the embodiment of the present application. As shown in FIG. 5, the electronic device may be a virtual reality device. The virtual reality device may include a head piece 51, an eye shield 52, a lens 53, a display panel 54, a main board 55, a front cover 56, and a light shielding plate 57. The eye shield 52 may include a light channel entrance, and the light shielding plate 57 may be installed above the headpiece 51. When the virtual reality device is worn (that is, in a working state), the light shielding plate 57 may be in an open posture (a first posture), for allowing light to enter. When the virtual reality device is not worn (that is, in an idle state), the light shielding plate 57 may be in a closed posture to prevent light from entering.

In some embodiments, the data indicating whether the electronic device is worn may be status indication information. For example, the status indication information may be an on-state indication or an off-state indication of the electronic device, and the first condition may be that the state indication information is the on-state indication of the electronic device. When the electronic device is worn, it indicates that the user is ready to use or is using the electronic device, correspondingly, the on-state indication may be used to indicate that the electronic device is worn. When the electronic device is not worn, it means that the user is not using the electronic device. Therefore, the off state may be used to indicate that the electronic device is not worn.

In another embodiment, the data indicating whether the electronic device is worn may be a pressure value collected by a pressure sensor, and the first condition may be that the pressure value is greater than a pressure threshold. The pressure sensor may be disposed at a contact position of the electronic device with the user. When the user wears the electronic device, the user will apply a certain amount of pressure to the electronic device. When the pressure value detected by the pressure sensor is greater than the pressure threshold, the electronic device may be in a worn state. When the pressure value detected by the pressure sensor is less than or far less than the pressure threshold, the electronic device may be in an unworn state. The judgment of whether the electronic device is worn based on the pressure value can more accurately indicate whether the electronic device is worn.

In some embodiments, the detector may be configured to obtain data indicating whether the electronic device enters an off state. Correspondingly, the processing unit may be configured to generate a control instruction when the data indicating whether the electronic device enters the off state meets a first condition. The first condition may be that the detection data indicates that the electronic device enters the off state. For example, the detection data may be a shutdown instruction.

When the electronic device receives the shutdown instruction, the electronic device may directly generate a control instruction to reduce the influence of the ambient light on the display device. Compared with the method detecting the wearing state to generate control instructions, this method may detect accurately. Although the electronic device may be still on when the user is not wearing in some cases, and the ambient light may affect the display device. The affect may be ignored in the short time.

In some embodiments, the display device may specifically include: a display component for outputting an initial light corresponding to the displayed content; and an optical component located in an irradiation range of the initial light for forming the emitted light. The ambient light outside the electronic device may be incident on the display component through the optical component along a direction opposite to the emitted light. The diameter of the initial light may be larger than the diameter of the emitted light. The optical component may have a divergent effect on the initial light and a converging effect on the incident light.

In Scenario 4, the detector may be connected to the display device and may be configured to obtain an environmental parameter of the display device; and the processing unit may be configured to generate a control instruction in response to the environmental parameter meeting the first condition.

The environment parameter may include a temperature parameter or a light intensity parameter of the display device; and the processing unit may be specifically configured to generate the control instruction in response to the temperature parameter or light intensity parameter meeting the first condition.

When the environmental parameter includes the temperature parameter, the display module may be divided into multiple sub areas. For example, the size of each sub areas is able to be 10*10 pixels, 20*20 pixels or 50*50 pixels. The division of the sub areas is able to be determined according to the actual needs. The temperature at the center of each sub area is taken as the temperature of the sub area. When measuring the temperature of one sub area, the temperature at the center of the sub area may be conducted to a temperature sensor through a metal lead. The temperature sensor may detect the temperature of different sub areas to obtain at least one temperature value, and determines the maximum temperature value of the display module from the at least one temperature value. The position of the metal lead wires may be evenly or unevenly distributed on the surface of the display module. When the metal lead wires are evenly distributed, the metal lead wires may be disposed at the center of each sub area. When the metal lead wires are unevenly distributed, the distribution density of the metal lead wires in the focus area may be larger than the distribution density of the metal lead wires in the non-focus area. Since the light intensity received on the surface of the display screen in the focus area is the largest, the highest temperature value may appear at the focus frequently. Therefore, the detecting efficiency of the temperature value may be improved by disposing the temperature sensor near the focus. When detecting the temperature conducted by the multiple metal lead wires, the multiple metal lead wires may be detected at the same time or sequentially in the way of rotation training. The dispose of the metal lead wires may not block the display module, and the user may not perceive the existence of the metal lead wires when watching.

The first condition may be that the temperature value is larger than the temperature threshold, and/or the temperature change is larger than the temperature change threshold.

When the environmental parameter includes the light intensity parameter, the display device may be divided into a plurality of sub-areas similarly, and the light intensity in different sub-areas may be detected by the light sensors.

The first condition may be that the light intensity is larger than the light intensity threshold, and/or the light intensity change is larger than the light intensity change threshold.

In some embodiments, the display device may specifically include: a display component for outputting an initial light corresponding to the displayed content; and an optical component located in an irradiation range of the initial light for forming the emitted light. The ambient light outside the electronic device may be incident on the display component through the optical component along a direction opposite to the emitted light. The diameter of the initial light may be larger than the diameter of the emitted light. The optical component may have a divergent effect on the initial light and a converging effect on the incident light.

In some embodiments, detecting the environmental parameter of the display device may include detecting the environmental parameter of the display module.

In the present disclosure, the detection data may be acquired by detecting the status of the electronic device. When the electronic device is in a state indicated by the first condition, the adjustment device may be controlled to operate, to reduce the influence of the ambient light on the display device of the electronic device. For example, an increase of the temperature in the display device induced by the irradiation of the ambient light may be reduced.

Figure 6:
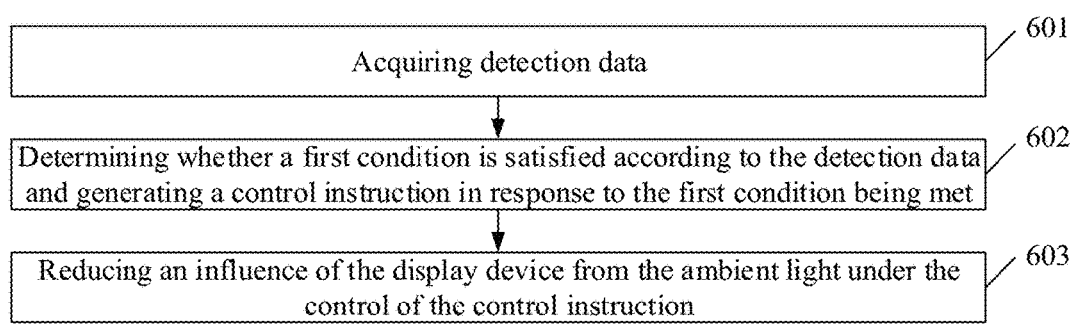
FIG. 6 illustrates an example control method for an electronic device consistent with various disclosed embodiments of the present disclosure.

The present disclosure also provides a control method of an electronic device. As illustrated in FIG. 6, the method may include:

S601: acquiring detection data;

S602: determining whether a first condition is satisfied according to the detection data and generating a control instruction when the first condition is satisfied; and S603: reducing influence of the ambient light on the display device of the electronic device under the control of the control instruction.

The display device may be configured to emit light corresponding to the display content according to a display signal, where the emitted light may be light that is able to be used to allow a viewer to perceive the display content. Ambient light outside the electronic device is able to be incident on the display device along a direction opposite to the emitted light.

The electronic device may be any electronic device including a display device. The processing unit may be also used to control the display device to output the display content. The display device may include any display panel such as a liquid crystal display panel, a light emitting diode display panel, an organic light emitting diode display panel, and an electronic ink panel.

S601 to S603 may be implemented by one or more devices in the electronic device. For example, S601 may be implemented by the detector in the electronic device, S602 may be implemented by the processing unit of the electronic device, and S603 may be implemented by the adjustment device of the electronic device.

The control method provided by various embodiments of the present disclosure provides a variety of specific processing scenarios, which are described separately below.

In Scenario 1, the display device may include a display module for output initial light corresponding to the displayed content, and an optical module in an irradiation range of the initial light for forming the emitted light. Along the direction opposite to the emitted light, the ambient light outside the electronic device may incident on the display module through the optical module. A diameter of the emitted light may be larger than a diameter of the initial light. When the display module is small, the optical module (such as the lens group) may change an propagation path of initial light of the display module, to form an enlarged virtual image of the display content on the display module that is able to be perceivable to the user. The optical module may have a divergent effect on the initial light and a converging effect on the reversely incident light.

FIG. 2A illustrates a display device provided by an embodiment of the present disclosure. As illustrated in FIG. 2A, the display device may include a display module 21 and an optical module 22. Solid arrows indicate a direction of the emitted light of the display device, and dashed arrows indicate a direction of the incident light of the display device. When the display device operates, the solid arrows between the display module 21 and the optical module 22 denote initial light. Light path of the initial light may be changed after the initial light passes through the optical module 22, and divergent emitted light may be achieved. The emitted light may be emitted to the external space of the electronic device and may be perceivable to users. When the display device is not in operation, ambient light may be converged on the display module 21 through the optical module 22 along a direction opposite to the direction of the emitted light (a direction indicated by the dashed arrows in FIG. 2A). For description purposes only, the embodiment in FIG. 2A where only one light path of the emitted light and the incident light is shown is used as an example to illustrate the present disclosure and should not limit the scopes of the present disclosure. In various embodiments, the display device may have any suitable light path.

Because of the converging effect of the optical module on the ambient light, when the ambient light reaches the display module via the optical component, it may be converged in a part of the display module, which may increase the light intensity of a part of the area. Therefore, it is necessary to reduce the light intensity of these areas to prevent the temperature of these areas from being too high due to excessive light intensity for a long time, which may damages the display component and thereby cause yellowing to affect the display effect of reuse.

The adjustment device may change optical parameters of the display device controlled by the control instruction, to reduce a difference between the light intensity of unit areas of the display module.

In some embodiments, reducing the difference between the light intensity of the unit areas of the display module may be substantially reducing the maximum light intensity on the unit areas. The unit areas may be sub-areas into which the display module is divided. For example, the size of each sub-area may be 10*10 pixels, 20*20 pixels, or 50*50 pixels. The granularity of the unit areas may be determined according to actual needs. Specifically, the display module is able to be divided into multiple sub-areas, and the average light intensity in each sub-area may be used as the light intensity of the sub-area or the light intensity at the center of each sub-area may be used as the light intensity of the sub-area. When the convergence of the incident light is too strong, there will be a large difference between the light intensity of one sub-area and the light intensity of other sub-areas. When the convergence degree is reduced by changing the focal length, the light intensity difference between the sub-area that have a large light intensity originally and the other sub-areas may decrease. Correspondingly, the light intensity difference can also be used as a basis for measuring the adjustment effect.

The difference in light intensity of unit areas may be the difference between the maximum light intensity and the minimum light intensity of the display module, or the difference between the maximum light intensity and the average light intensity of the entire display module. For example, the display module may be divided into four sub-areas. Before the adjustment device changes the optical parameters of the display device, the light intensity of the four sub-areas may be 3, 5, 7, 3, and the average light intensity may be 4.5. A difference between the maximum light intensity and the minimum light may be 4, and the difference between the maximum light intensity and the average light intensity may be 2.5. After changing the optical parameters of the display device, the light intensities of the four sub-areas a=may be 3, 3, 4, and 3, respectively, and the average light intensity may be 3.25. The difference between the maximum light intensity and minimum light intensity may be 1, and the difference between the maximum light intensity and average light intensity may be 0.75. It is obvious that the adjustment device reduces the difference in light intensity of the unit areas of the display module by changing the optical parameters of the display device.

The optical parameter may be a focal length of the optical module. In some embodiments, the optical module has a first mode and a second mode. The first mode has a first focal length, and the second mode has a second focal length. The adjusting device may be configured to convert the optical module from the first mode to the second mode. A distance between the focal point and the display module when the optical module is at the second focal length may be larger than a distance between the focal point and the display module when the optical module is at the first focal length. That is, by changing the focal length of the optical module, the focus of the optical module may fall in a space other than the display module, such as the space in front of or behind the display module. With the total light intensity unchanged, the change in focal length may spread the total light intensity over a larger area to reduce the maximum light intensity received in a unit area.

FIG. 2B illustrates a display device provided by the embodiment of the present disclosure. As illustrated in FIG. 2B, when the focal length of the optical module 22 is L1, the focus may fall on the display module 21. It is able to be understood that all incident light may be concentrated near the focal point. When the focal length of the optical module 22 is L2 (L2 is larger than L1), the focus falls behind the display module. The incident light converging near the focus may be spread into a larger area, to reduce the maximum light intensity received in a unit area.

FIG. 2C illustrates a display device provided by the embodiment of the present disclosure. As illustrated in FIG. 2C, when the focal length of the optical module 22 is L1, the focus may fall on the display module 21. It is able to be understood that all incident light may be concentrated near the focal point. When the focal length of the optical module 22 is L3 (L3 is smaller than L1), the focus falls in front of the display module. The incident light converging near the focus originally may be spread into a larger area, to reduce the maximum light intensity received in a unit area.

FIG. 2D illustrates the light of the display module provided by the embodiment of the present disclosure. As illustrated in FIG. 2D, when the focal length of the optical module is L1, a corresponding illuminated area on the display module 21 is 21a; when the focal length of the optical module is L2, a corresponding illuminated area on the display module 21 is 21b; when the focal length of the optical module is L3, a corresponding illuminated area on the display module 21 is 21c. An illuminated area with a darker color may have a large light intensity. When the incident light is the same, an illuminated area with a larger area may have a smaller maximum light intensity received per unit area. Correspondingly, the average light intensity in the illuminated area 21c is smaller than the illuminated area 21b, and the average light intensity in the illuminated area 21b is smaller than the illuminated area 21a.

In some embodiments, the method for adjusting the focal length of the display device may further include: when the optical module is a single optical device, adjusting the focal length of the display device by changing the optical characteristics of the optical device. For example, the thickness of the convex lens is able to be adjusted, and the specific convex lens may have elastic sidewalls and liquid/gas fillings. The elastic sidewall may be deformed to change the focal length of the lens. For example, the side wall of the convex lens may be a transparent material with a certain elastic deformation capacity. An internal space of the convex lens may be filled with liquid or gas. A volume of the convex lens may be increased by filling liquid or gas into the internal space of the convex lens. Correspondingly, at least one of the parameters including refractive index, thickness, and radius of curvature of the convex lens, may be changed to increases the focal length of the convex lens. Some liquid or gas may be excluded from the convex lens to make the volume of the convex lens smaller. Correspondingly, at least one of the parameters including refractive index, thickness, and radius of curvature of the convex lens, may be changed to reduce the focal length of the convex lens. A change in the refractive index of the convex lens may be also related to the refractive indices of the liquid and the gas itself. In some other embodiments, when the optical module contains multiple optical devices such as a lens group, a positional relationship between the lenses may be adjusted to change the focal length.

In another embodiment, the optical module and the display module may have a first positional relationship and a second positional relationship, and the adjustment device may be configured to convert the positional relationship of the optical module and the display module from the first positional relationship to the second positional relationship. The distance between the focus of the optical module and the display module in the second positional relationship may be larger than the distance between the focus of the optical module and the display module in the first positional relationship. That is, the focus of the optical module may be configured to fall in a space outside the display module by changing the positional relationship between the optical module and the display module.

FIG. 3 illustrates another display device consistent with various embodiments of the present disclosure. As illustrated in FIG. 3, in some embodiments, a first positional relationship may be a positional relationship between the display module 21 and the optical module 22 when the display module 21 is located at the first position, and a second positional relationship may be a positional relationship between the display module 21 and the optical module 22 when the display module 21 is located at the second position. As illustrated in FIG. 3, when the display module 21 is located at the first position, the focus of the optical module may fall on the display module 21, and when the display module 21 is located at the second position, the focus of the optical module may fall in the space in front of the display module 21. When the display module 21 is moved from the first position to the second position, the incident light that originally is concentrated near the focus may be spread into a larger area, to reduce the maximum light intensity in the unit area.

In various embodiments, adjustment of the position relationship between the display module 21 and the optical module 22 may be achieved by changing the position of the display module 21, by changing the position of the optical module 22, or by changing the position of both the display module 21 and the optical module 22.

In some embodiments of the present application, in addition to responding to the control instruction, the adjustment device may also respond to an adjustment input to implement mechanical adjustment. The adjustment input may be a focus adjustment instruction input through a focus adjustment knob. That is, a manual focus adjustment may be achieved by the focus adjustment knob.

In addition to the functions described in the above embodiments of the present application, the adjustment device may also be used to adjust the emitted light formed according to the initial light, so that the emitted light may allow a viewer to perceive the display content. That is, the adjustment device may be an original device for adjusting display effects of the electronic device. The electronic device provided in the embodiment of the present disclosure may multiplex the original adjustment device, and the control method of the present disclosure may be implemented without adding additional hardware units.

Figure 7A:
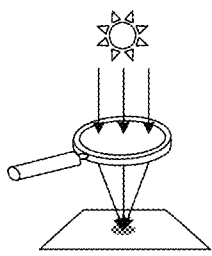
FIG. 7A illustrates the convergence of the light in an example display device consistent with various disclosed embodiments of the present disclosure.
Figure 7B:
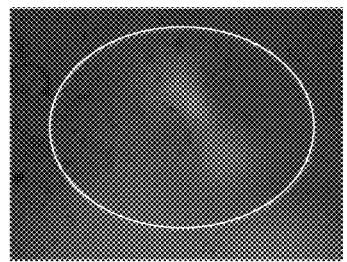
FIG. 7B illustrates an example display device being affected consistent with various disclosed embodiments of the present disclosure.
Figure 7C:
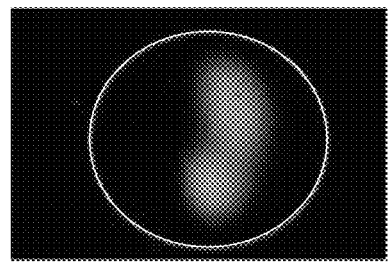
FIG. 7C illustrates an example display device being affected consistent with various disclosed embodiments of the present disclosure.

FIG. 7A illustrate a principle of irradiation of the display panel by sunlight. In FIG. 7, a magnifying glass is used instead of the optical module of the display device. A distance between the magnifying glass and the display panel may be the focal length of the magnifying glass, so that the focus of the magnifying glass may just fall on the display panel. After the light is focused by the magnifying glass, bright spots may be formed at the focus of the display panel. The temperature of the bright spots may be higher than other areas. Long-term exposure will cause the yellow spots to appear in the bright spots and affect the display effect. FIG. 7B shows the first yellowing phenomenon that appears on the display panel under the influence of sunlight and other ambient light for a long time. The bright spots in the oval area are the affected areas. FIG. 7C shows a second yellowing phenomenon that appears on the display panel under the influence of sunlight and other ambient light for a long time, and the bright spots in the circular area are the affected areas.

In another embodiment, the control method of the electronic device may include:

S701: acquiring first detection data;

S702: generating a first sub-instruction when the first detection data satisfies the first condition; and S703: performing adjustment using a first manner in response to the first sub-instruction, and returning to S701 to acquire second detection data.

When performing S702 according to the second detection data, when a change of the second detection data relative to the first detection data is not far from the first condition, a second sub-instruction may be generated. Then S703 may be executed to perform adjustment in a second manner opposite to the first manner in response to the second sub-instruction. When the change of the second detection data relative to the first detection data is far from the first condition, the adjustment may be performed still in the first manner.

The first condition may include: a parameter value of the detection data is larger than a parameter threshold, and/or a parameter value change amount is larger than a change amount threshold value. For example, when the detection data is temperature data, the first condition may be that the temperature value is larger than a temperature threshold value; and/or that the temperature value change amount is larger than a change amount threshold value. The temperature threshold may be an upper limit value of the operating temperature range of the display module, such as 40 Celsius degrees, and the first condition may be satisfied when the maximum temperature value of the display module is larger than 40 Celsius degrees. The temperature change threshold may be used to measure a speed of the temperature change, and may be a maximum temperature change allowed in a unit time. For example, the maximum temperature change allowed within 1 hour may be 5 Celsius degrees. The first condition may be satisfied when the temperature change of the display module within 1 hour is larger than 5 Celsius degrees.

The first manner may be converting the optical module from the first mode to the second mode, or converting the position relationship between the optical module and the display module from the first position relationship to the second position relationship. The second manner may be converting the optical module from the second mode to the first mode or converting the position relationship between the optical module and the display module from the second position relationship to the first position relationship. The distance between the focus of the optical module with the second focal length and the display module, and the distance between the focus of the optical module with the first focal length and the display module may change. The distance between the focus of the optical module length and the display module in the second position relationship, and the distance between the focus of the optical and the display module in the first position relationship may not be fixed.

The first sub-instruction may be generated when the first detection data meets the first condition, and the focal length of the optical module or the position relationship between the optical module and the display module may be adjusted in response to the first sub-instruction. After a certain period, the second detection data may be obtained. Whether the previous first manner can reduce an influence of the ambient light on the display device may be determined according to the second detection data, that is, whether the change of the second detection data relative to the first detection data is far from the first condition may be determined. That the change of the second detection data relative to the first detection data is far from the first condition may be that a difference between the parameter value of the first detection data and the parameter threshold value is larger than a difference between the parameter value of the second detection data and the parameter threshold value. When a change trend of the second detection data relative to the first detection data is becoming smaller and smaller than the parameter threshold value from close to the parameter threshold value, the change of the second detection data relative to the first detection data may be far from the first condition. That the change of the second detection data relative to the first detection data is not far from the first condition may be that a difference between the parameter value of the first detection data and the parameter threshold value is smaller than a difference between the parameter value of the second detection data and the parameter threshold value. When a change trend of the second detection data relative to the first detection data is becoming larger and larger than the parameter threshold value, the change of the second detection data relative to the first detection data may be not far from the first condition.

When the change of the second detection data relative to the first detection data is not far from the first condition, the second sub-instruction may be generated, and the adjustment may be performed in the second manner in response to the second sub-instruction. The second manner may be opposite to the first manner. That is, when the first manner increases the focal length, the second manner may reduce the focal length; may the first manner reduces the focal length, the second manner will increase the focal length; may the first manner increases the distance between the display module and the optical module, the second manner may reduce the distance between the display module and the optical module; may the first manner decreases the distance between the display module and the optical module, the second manner may increase the distance between the display module and the optical module.

In the present disclosure, when the adjustment direction cannot be determined, the current adjustment manner may be determined whether it makes the focus closer to the display module or away from the display module by determining whether the change of the second detection data relative to the first detection data is far from the first condition. When the adjustment manner makes the focus closer to the display module (that is, the change of the second detection data relative to the first detection data is not far from the first condition), the present adjustment direction may be opposite to the desired direction, and an automatic adjustment of the adjustment direction or reminding the user to manual adjust may be achieved by generating the second sub-instruction. When the adjustment manner makes the focus away from the display module (that is, the change of the second detection data relative to the first detection data is far from the first condition), the present adjustment direction may be same as the desired direction. When the adjustment direction cannot be determined, whether the present adjustment direction is same as the desired direction may be determined precisely by the present method, and an adjustment error may be avoided.

In some embodiments, finally, the relative position between the optical module and the display module may be adjusted to a specific position that focus is completely impossible. For example, the optical module may be moved out of the optical path that the light incidents on the display device along the direction opposite to the direction of the emitted light, that is, the display module or the optical module may be moved along a direction perpendicular to the optical path direction, for example, left and right or up and down. In another embodiment, the focal length of the optical module may be adjusted out of an allowable range of focal length change when the display device displays normally. The allowable range of focal length change when the display device displays normally may means that: when the focal length changes within the allowable range, the focusing operation under different modes is able to be realized, and when the focal length is outside the range, the focusing cannot be realized. That is, the focus of the optical module may not fall on the display module, and the display device cannot display normally.

The detection data may be be a temperature value. For example, when the temperature value is the temperature value of the surface of the display module, the display module may be divided into multiple sub areas. For example, the size of each sub areas is able to be 10*10 pixels, 20*20 pixels or 50*50 pixels, and the granularity of the sub areas is able to be determined according to the actual needs. The temperature at the center of each sub area is taken as the temperature of the sub area. When measuring the temperature of one sub area, the temperature at the center of the sub area may be conducted to a temperature sensor through a metal lead. The temperature sensor may detect the temperature of different sub areas to obtain at least one temperature value, and determines the maximum temperature value of the display module from the at least one temperature value. The position of the metal lead wires may be evenly or unevenly distributed on the surface of the display module. When the metal lead wires are evenly distributed, the metal lead wires may be disposed at the center of each sub area. When the metal lead wires are unevenly distributed, the distribution density of the metal lead wires in the focus area may be larger than the distribution density of the metal lead wires in the non-focus area. Since the light intensity received on the surface of the display screen in the focus area is the largest, the highest temperature value may appear at the focus frequently. Therefore, the detecting efficiency of the temperature value may be improved by disposing the temperature sensor near the focus. When detecting the temperature conducted by the multiple metal lead wires, the multiple metal lead wires may be detected at the same time or sequentially in the way of rotation training. The dispose of the metal lead wires may not block the display module, and the user may not perceive the existence of the metal lead wires when watching.

In some embodiments, the temperature value may be temperature near the display module of the electronic device. For example, when the incident amount of ambient light is larger, the brightness near the display module of the electronic device may be larger. The temperature sensor may be disposed near the display module and outside the light path of the incident light. The temperature threshold value may be determined experimentally. The detected temperature value in the non-operation state smaller than the temperature threshold value may indicate that the intensity of the light incident into the interior of the electronic device is within the allowable range. Otherwise the intensity of the light incident into the interior of the electronic device may exceed the allowable range. When the incident amount of the ambient light is too large, the surface temperature of the display module may be too high.

In another embodiment, the detection data may be the light intensity. For example, the light intensity may be the light intensity on the surface of the display module. An image acquisition unit (such as a camera) may be disposed inside the electronic device. The image acquisition unit can collect images of at least a part of the display area in the display module, and may be disposed outside the incident light path. As the surface of the display module is brighter when the light intensity is stronger, after the image acquisition unit collects the image of the display module, it may perform image processing to obtain the gray values of the images in different sub areas. When the gray value of one sub area is larger, the light intensity of the sub-area may be stronger. The gray value of the image in one sub area is able to be the gray value of the pixel at the center of the sub area, or the average value of the gray value of the pixels in the sub area.

Correspondingly, in some embodiments, the first condition may be that the temperature value is larger than the temperature threshold value; and/or that the temperature value change amount is larger than the change amount threshold value. The temperature threshold may be the upper limit of the operating temperature range of the display module. The temperature change threshold may be used to measure the temperature change speed, and may be the maximum temperature change allowed in a unit time.

In another embodiment, the first condition may be that the light intensity is larger than the light intensity threshold value; and/or, the light intensity change amount is larger than the change amount threshold value. The light intensity threshold may be the maximum light intensity value that the display module can withstand. When the light intensity received by the display module is larger than the light intensity threshold, it will affect the display effect. The light intensity change threshold may be used to measure the speed of light intensity change, and may be the maximum light intensity change allowed in a unit time.

In Scenario 2, the adjustment device may be used to adjust an incident amount of the ambient light incident on the display device along the direction opposite to the direction of the emitted light under the control of the control instruction. Reducing the influence of the ambient light on the display device may be achieved by reducing the incident amount of the ambient light incident on the display device.

In some embodiments, the adjustment device may include a shielding component; the shielding component may be disposed in the light path of the light incident on the display device along the direction opposite to the emitted light, and may have a first state and a second state. When the shielding component is in a first state, a first ratio of the ambient light is able to be incident on the display device, and when the shielding component is in a second state, a second ratio of the ambient light is able to be incident on the display device. The first ratio may be larger than the second ratio.

For example, the shielding component in the first state may correspond to a first cross section in the light path; in the second state, the shielding component may correspond to a second cross section in the light path. The first cross section may be smaller than the second cross section.

In some embodiments, in a first state, the shielding component may be in a first posture; in a second state, the shielding component may be in a second posture. When the shielding component is a retractable component, the first posture may be a folded posture or a wound posture, and the second posture may be a tiled posture. Specifically, the folding posture is able to be shaped like a shutter where a plurality of light shielding sheets may be stacked together, and the corresponding tile posture may be that the plurality of light shielding sheets may be sequentially connected in the same plane. The winding posture may be similar to the closed state of a scroll, and the corresponding tile posture may be similar to an expanded state of the scroll.

FIG. 4 illustrates a schematic structural diagram of the display device in the embodiment of the present application. As shown in FIG. 4, the shielding component may be a shielding plate 42. The light path of the light that is incident on the display device 41 along the direction opposite to the emitted light may be the solid lines in FIG. 4 pointing to the left. When the shielding plate 42 is in the first state, there may be no first cross section (it can also be understood that the first cross-sectional area may be 0) and the first ratio may be 100%. The shielding plate 42 may not block the incident light path. The incident light enters the entrance of the light channel and reaches the display device 41. When the shielding plate 42 is in the second state shown by the dotted line, the second cross section may be the cross section of the entrance of the light channel, and the second ratio may be 0%. The shielding plate may completely block the entrance of the light channel, and the incident light cannot reach the display device 41. For description purposes only, the above first ratio and second ratio are used as an example where the light scattering is not taken into account, and it should not limit the actual block ratio. The actual block ratio may be different from the above example.

In some embodiments, the shielding component in the first state may have a first light transmittance, and the shielding component in the second state may have a second light transmittance. The first light transmittance may be larger than the second light transmittance.

In some embodiments, the shielding component may be a lens. The lens may have a high light transmittance when the ambient light is weak, and a low light transmittance when the ambient light is strong. For example, the lens may be a spectacle lens with variable transmittance. The lens may automatically change the transmittance when receiving strong ambient light.

In some embodiments, the display device may specifically include: a display component for outputting an initial light corresponding to the displayed content; and an optical component located in an irradiation range of the initial light for forming the emitted light. The ambient light outside the electronic device may be incident on the display component through the optical component along a direction opposite to the emitted light. The diameter of the initial light may be larger than the diameter of the emitted light. The optical component may have a divergent effect on the initial light and a converging effect on the incident light.

In Scenario 3, the electronic device may further include a wearing device. The wearing device may be configured to maintain a relative positional relationship between the electronic device and a viewer, so that after the electronic device is worn by the viewer, the emitted light may be directed toward the viewer.

In some embodiments, S601 may include: acquiring data indicating whether the electronic device is worn; S602 may include generating a control instruction in response to the data indicating whether the electronic device is worn satisfies the first condition; and S603 may include reducing the influence of the display device from the ambient light under the control of the control instruction. The first condition may be a condition indicating that the electronic device is worn.

That is, the electronic device may be a wearable device, such as a helmet-type device, a glasses-type device, a bracelet device, and the like.

FIG. 5 is a schematic structural diagram of an electronic device in the embodiment of the present application. As shown in FIG. 5, the electronic device may be a virtual reality device. The virtual reality device may include a head piece 51, an eye shield 52, a lens 53, a display panel 54, a main board 55, a front cover 56, and a light shielding plate 57. The eye shield 52 may include a light channel entrance, and the light shielding plate 57 may be installed above the headpiece 51. When the virtual reality device is worn (that is, in a working state), the light shielding plate 57 may be in an open posture (a first posture), for allowing light to enter. When the virtual reality device is not worn (that is, in an idle state), the light shielding plate 57 may be in a closed posture to prevent light from entering.

In some embodiments, the data indicating whether the electronic device is worn may be status indication information. For example, the status indication information may be an on-state indication or an off-state indication of the electronic device, and the first condition may be that the state indication information is the on-state indication of the electronic device. When the electronic device is worn, it indicates that the user is ready to use or is using the electronic device, correspondingly, the on-state indication may be used to indicate that the electronic device is worn. When the electronic device is not worn, it means that the user is not using the electronic device. Therefore, the off state may be used to indicate that the electronic device is not worn.

In another embodiment, the data indicating whether the electronic device is worn may be a pressure value collected by a pressure sensor, and the first condition may be that the pressure value is greater than a pressure threshold. The pressure sensor may be disposed at a contact position of the electronic device with the user. When the user wears the electronic device, the user will apply a certain amount of pressure to the electronic device. When the pressure value detected by the pressure sensor is greater than the pressure threshold, the electronic device may be in a worn state. When the pressure value detected by the pressure sensor is less than or far less than the pressure threshold, the electronic device may be in an unworn state. The judgment of whether the electronic device is worn based on the pressure value can more accurately indicate whether the electronic device is worn.

In some other embodiments, S610 may include acquiring data indicating whether the electronic device enters an off state. Correspondingly, S602 may include generating a control instruction when the data indicating whether the electronic device enters the off state meets a first condition. The first condition may be that the detection data indicates that the electronic device enters the off state. For example, the detection data may be a shutdown instruction.

When the electronic device receives the shutdown instruction, the electronic device may directly generate a control instruction to reduce the influence of the ambient light on the display device. Compared with the method detecting the wearing state to generate control instructions, this method may detect accurately. Although the electronic device may be still on when the user is not wearing in some cases, and the ambient light may affect the display device. The affect may be ignored in the short time.

In some embodiments, the display device may specifically include: a display component for outputting an initial light corresponding to the displayed content; and an optical component located in an irradiation range of the initial light for forming the emitted light. The ambient light outside the electronic device may be incident on the display component through the optical component along a direction opposite to the emitted light. The diameter of the initial light may be larger than the diameter of the emitted light. The optical component may have a divergent effect on the initial light and a converging effect on the incident light.

In Scenario 4, S601 may include acquiring an environmental parameter of the display device; and S602 may include generating a control instruction in response to the environmental parameter meeting the first condition.

The environment parameter may include a temperature parameter or a light intensity parameter of the display device; and the processing unit may be specifically configured to generate the control instruction in response to the temperature parameter or light intensity parameter meeting the first condition.

When the environmental parameter includes the temperature parameter, the display module may be divided into multiple sub areas. For example, the size of each sub areas is able to be 10*10 pixels, 20*20 pixels or 50*50 pixels. The division of the sub areas is able to be determined according to the actual needs. The temperature at the center of each sub area is taken as the temperature of the sub area. When measuring the temperature of one sub area, the temperature at the center of the sub area may be conducted to a temperature sensor through a metal lead. The temperature sensor may detect the temperature of different sub areas to obtain at least one temperature value, and determines the maximum temperature value of the display module from the at least one temperature value. The position of the metal lead wires may be evenly or unevenly distributed on the surface of the display module. When the metal lead wires are evenly distributed, the metal lead wires may be disposed at the center of each sub area. When the metal lead wires are unevenly distributed, the distribution density of the metal lead wires in the focus area may be larger than the distribution density of the metal lead wires in the non-focus area. Since the light intensity received on the surface of the display screen in the focus area is the largest, the highest temperature value may appear at the focus frequently. Therefore, the detecting efficiency of the temperature value may be improved by disposing the temperature sensor near the focus. When detecting the temperature conducted by the multiple metal lead wires, the multiple metal lead wires may be detected at the same time or sequentially in the way of rotation training. The dispose of the metal lead wires may not block the display module, and the user may not perceive the existence of the metal lead wires when watching.

The first condition may be that the temperature value is larger than the temperature threshold, and/or the temperature change is larger than the temperature change threshold.

When the environmental parameter includes the light intensity parameter, the display device may be divided into a plurality of sub-areas similarly, and the light intensity in different sub-areas may be detected by the light sensors.

The first condition may be that the light intensity is larger than the light intensity threshold, and/or the light intensity change is larger than the light intensity change threshold.

In some embodiments, the display device may specifically include: a display component for outputting an initial light corresponding to the displayed content; and an optical component located in an irradiation range of the initial light for forming the emitted light. The ambient light outside the electronic device may be incident on the display component through the optical component along a direction opposite to the emitted light. The diameter of the initial light may be larger than the diameter of the emitted light. The optical component may have a divergent effect on the initial light and a converging effect on the incident light.

In some embodiments, detecting the environmental parameter of the display device may include detecting the environmental parameter of the display module.

In the present disclosure, the detection data may be acquired by detecting the status of the electronic device. When the electronic device is in a state indicated by the first condition, the adjustment device may be controlled to operate, to reduce the influence of the ambient light on the display device of the electronic device. For example, an increase of the temperature in the display device induced by the irradiation of the ambient light may be reduced.

The present disclosure also provides a computer-readable storage medium, for example, a memory including program instructions. The program instructions may be executed by a processor of a terminal to complete the methods provided by various embodiment.

Those of ordinary skill in the art will appreciate that the example elements and algorithm steps described above is able to be implemented in electronic hardware, or in a combination of computer software and electronic hardware. Whether these functions are implemented in hardware or software depends on the specific application and design constraints of the technical solution. One of ordinary skill in the art can use different methods to implement the described functions for different application scenarios, but such implementations should not be considered as beyond the scope of the present disclosure.

For simplification purposes, detailed descriptions of the operations of example systems, devices, and units may be omitted and references is able to be made to the descriptions of the example methods.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit.

A method consistent with the disclosure can be implemented in the form of computer program stored in a non-transitory computer-readable storage medium, which can be sold or used as a standalone product. The computer program can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random access memory (RAM), a magnetic disk, or an optical disk.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:
1. An electronic device, comprising:
  a display device, configured to output emitted light of corresponding displayed content according to a display signal, wherein:
    the emitted light is configured to allow the displayed content to be perceivable to a viewer,
    ambient light outside the electronic device is able to be incident on the display device along a direction opposite to the emitted light; and
    the display device having an optical module that has a first mode and a second mode, wherein the first mode has a first focal length, the second mode has a second focal length,
  a detector, configured to acquire detection data;
  a processing unit, configured to determine whether a first condition is met according to the detection data and generate a control instruction in response to the first condition being met; and wherein the electronic device is configured to convert the optical module from the first mode to the second mode to reduce an influence of the ambient light on the display device under the control instruction.

2. The device according to claim 1, wherein the display device includes:
a display module, configured to output initial light corresponding to the displayed content; and wherein:
the optical module is in an irradiation range of the initial light, configured to output the emitted light, and the ambient light outside the electronic device is able to be incident on the display module through the optical module along the direction opposite to the emitted light.

3. The device according to claim 2, wherein:
the electronic device is configured to adjust optical parameters of the display device controlled by the control instruction, to reduce a difference between the light intensity of unit areas in the display module.

4. The device according to claim 3, wherein:
the optical module and the display module have a first positional relationship and a second positional relationship, wherein the electronic device is configured to convert the positional relationship of the optical module and the display module from the first positional relationship to the second positional relationship.

5. The device according to claim 3, wherein:
the detector is configured to acquire a first detection data;
the processing unit is configured to generate a first sub-instruction in response to the first detection data meeting the first condition;
the electronic device is configured to perform adjustment in a first manner in response to the first sub-instruction, wherein:
the detector is configured to acquire a second detection data subsequently; the processing unit is configured to generate a second sub-instruction in response to a change of the second detection data relative to the first detection data not becoming far from the first condition; and
the electronic device is configured to respond to the second sub-instruction and perform adjustment in a second manner opposite to the first manner.

6. The device according to claim 3, wherein:
the electronic device is configured to adjust an incident amount of the ambient light incident on the display device along the direction opposite to the direction of the emitted light under the control instruction.

7. The device according to claim 6, wherein:
the electronic device includes a shielding component;
the shielding component is disposed in a light path of the light incident on the display device along the direction opposite to the emitted light, and has a first state and a second state;
when the shielding component is in a first state, a first ratio of the ambient light is able to be incident on the display device, and when the shielding component is in a second state, a second ratio of the ambient light is able to be incident on the display device;
the first ratio is larger than the second ratio; and
the shielding component in the first state corresponds to a first cross section in the light path and the shielding component in the second state corresponds to a second cross section in the light path, wherein the first cross section is smaller than the second cross section; or
the shielding component in the first state has a first light transmittance, and the shielding component in the second state has a second light transmittance, wherein the first light transmittance is larger than the second light transmittance.

8. The device according to claim 1, further including a head piece for wearing, wherein:
the head piece for wearing is configured to maintain a relative positional relationship between the electronic device and the viewer, so that after the electronic device is worn by the viewer, the emitted light is directed toward the viewer;
the detector is configured to acquiring data indicating whether the electronic device is worn; and
the processing unit is configured to generate a control instruction in response to the data indicating whether the electronic device is worn meeting the first condition.

9. The device according to claim 1, wherein:
the detector is connected to the display device and configured to acquire an environmental parameter of the display device; and
the processing unit is configured to generate a control instruction in response to the environmental parameter meeting the first condition,
wherein:
the environment parameter includes a temperature parameter or a light intensity parameter of the display device; and
the processing unit is configured to generate the control instruction in response to the temperature parameter or light intensity parameter meeting the first condition.

10. A method, including:
acquiring detection data;
determining whether a first condition is satisfied according to the detection data and generating a control instruction in response to a first condition being met;
reducing an influence of the ambient light on a display device under the control instruction,
wherein the display device is configured to output emitted light of corresponding display content according to a display signal, and the display device having an optical module that has a first mode and a second mode, the first mode has a first focal length, the second mode has a second focal length, and reducing the influence of the ambient light including adjusting optical parameters of the display device by converting the optical module from the first mode to the second mode, and wherein, the emitted light allows the display content to be perceivable to a viewer, and ambient light outside the electronic device is able to be incident on the display device along a direction opposite to the emitted light.

11. The method according to claim 10, wherein the display device includes:
a display module, configured to output initial light corresponding to the displayed content; and wherein the optical module in an irradiation range of the initial light, configured to output the emitted light, wherein the ambient light outside the electronic device is able to be incident on the display module through the optical module along the direction opposite to the emitted light.

12. The method according to claim 11, wherein:
reducing the influence of the ambient light on a display device includes adjusting optical parameters of the display device controlled by the control instruction, to reduce a difference between the light intensity of unit areas in the display module.

13. The method according to claim 12, wherein:

the optical module and the display module have a first positional relationship and a second positional relationship; and adjusting optical parameters of the display device includes the positional relationship of the optical module and the display module from the first positional relationship to the second positional relationship.

14. The method according to claim 12, wherein:

adjusting optical parameters of the display device includes adjusting an incident amount of the ambient light incident on the display device along the direction opposite to the direction of the emitted light under the control instruction.

15. The method according to claim 10, wherein:

acquiring the detection data includes acquiring data indicating whether the electronic device is worn; and generating the control instruction in response to the first condition being met includes generating a control instruction in response to the data indicating whether the electronic device is worn meeting the first condition.

16. The method according to claim 10, wherein:

acquiring the detection data includes acquiring an environmental parameter of the display device; and generating the control instruction in response to the first condition being met includes generating a control instruction in response to the environmental parameter meeting the first condition.

17. The method according to claim 16, wherein:

the environment parameter includes a temperature parameter or a light intensity parameter of the display device; and generating the control instruction includes generating the control instruction in response to the temperature parameter or light intensity parameter satisfying the first condition.

18. A non-transitory computer-readable storage medium, containing program instructions for, when executed by a processor, performing a method, the method comprising:

acquiring detection data;

determining whether a first condition is satisfied according to the detection data and generating a control instruction in response to a first condition being met; and reducing an influence of the ambient light on a display device under the control instruction, wherein the display device is configured to output emitted light of corresponding display content according to a display signal, and the display device having an optical module that has a first mode and a second mode, the first mode has a first focal length, the second mode has a second focal length, and reducing the influence of the ambient light including adjusting optical parameters of the display device by converting the optical module from the first mode to the second mode, and wherein, the emitted light allows the display content to be perceivable to a viewer, and ambient light outside the electronic device is able to be incident on the display device along a direction opposite to the emitted light.

* * * * *